Feb. 2, 1954 W. S. DRUZ 2,668,234

NOISE-SUPPRESSION SYSTEM FOR TELEVISION RECEIVERS

Filed June 7, 1950

WALTER S. DRUZ.
*INVENTOR.*

BY Francis W. Crotty

HIS ATTORNEY

Patented Feb. 2, 1954

2,668,234

UNITED STATES PATENT OFFICE 2,668,234

NOISE-SUPPRESSION SYSTEM FOR TELEVISION RECEIVERS

Walter S. Druz, Chicago, Ill., assignor to Zenith Radio Corporation, a corporation of Illinois Application June 7, 1950, Serial No. 166,712

4 Claims. (Cl. 250—20)

This invention relates to a noise-suppression system for a television receiver and more particularly to a noise-suppression system of the type characterized by an adjustable clipping level that is varied with the intensity of a received signal.

One type of noise-suppression system heretofore known in the television art includes a limiting or clipping device coupled to the output circuit of the demodulator or the video amplifier. The clipper is operated at a fixed clipping level established in accordance with the signal intensity which it is expected the automatic-gain-control will maintain within narrow limits at the input to the signal detector. The amplitude peaks of extraneous signals, such as undesired noise which are greater than this level, are effectively eliminated and all signal portions within the level are relatively unaffected. Since the clipping device operates at a fixed clipping level, the signal-to-noise ratio in the output circuit of the device, for a given noise amplitude, decreases with a decrease in the strength of the received signal below that for which the clipper has been adjusted. Consequently, although this arrangement may provide satisfactory noise suppression for signals of sufficiently high intensity to assure accurate gain control, it is relatively ineffective for signals of lesser intensity.

It is an object of this invention, therefore, to provide an improved noise-suppression system for a television receiver which avoids the deficiency of the afore-described prior-art arrangement.

It is a further object of the invention to provide an improved noise-suppression system for a television receiver in which the amplitude range above which signals are clipped varies with the intensity of a received signal.

A noise-suppression system, in accordance with the present invention, is included in a wave-signal receiver for utilizing a negatively-modulated television signal that includes video components and recurring components representing a fixed shade value of black or blacker than black. The received television signal may be accompanied by spurious signals having an amplitude exceeding that of the recurring components. The system comprises a video-signal translating channel which includes a detector for deriving the modulation components of the received television signal. An amplitude clipper is included in the video channel and is conductively coupled in series relation with the detector. The clipper translates signal components within an amplitude range from zero to an upper limit which exceeds the amplitude level of the recurring components for a received television signal of given threshold intensity. A gain control circuit responsive only to a received signal which has an intensity greater than this threshold intensity is provided for deriving a control potential having a magnitude determined by the intensity of the received signal. Regulating means included in the clipper is responsive to an applied potential for increasing the upper limit of the amplitude range in which signals are translated toward a preselected reference level in accordance with the magnitude of the potential applied thereto. Means are provided for utilizing the control potential to tend to maintain the signal intensity to the detector within a narrow range for a wide range of received signal intensities. The system further includes means for applying the aforementioned control potential to the regulating means to establish the upper limit of the clipper amplitude at the aforementioned reference level during operating intervals in which the signal intensity to the detector is maintained within a narrow range.

The features of the present invention which are believed to be novel are set forth with particularity in the appended claims. The present invention itself, both as to its organization and manner of operation, together with further objects and advantages thereof, may best be understood by reference to the following description taken in connection with the accompanying drawing in which:

Figures 1, 2:
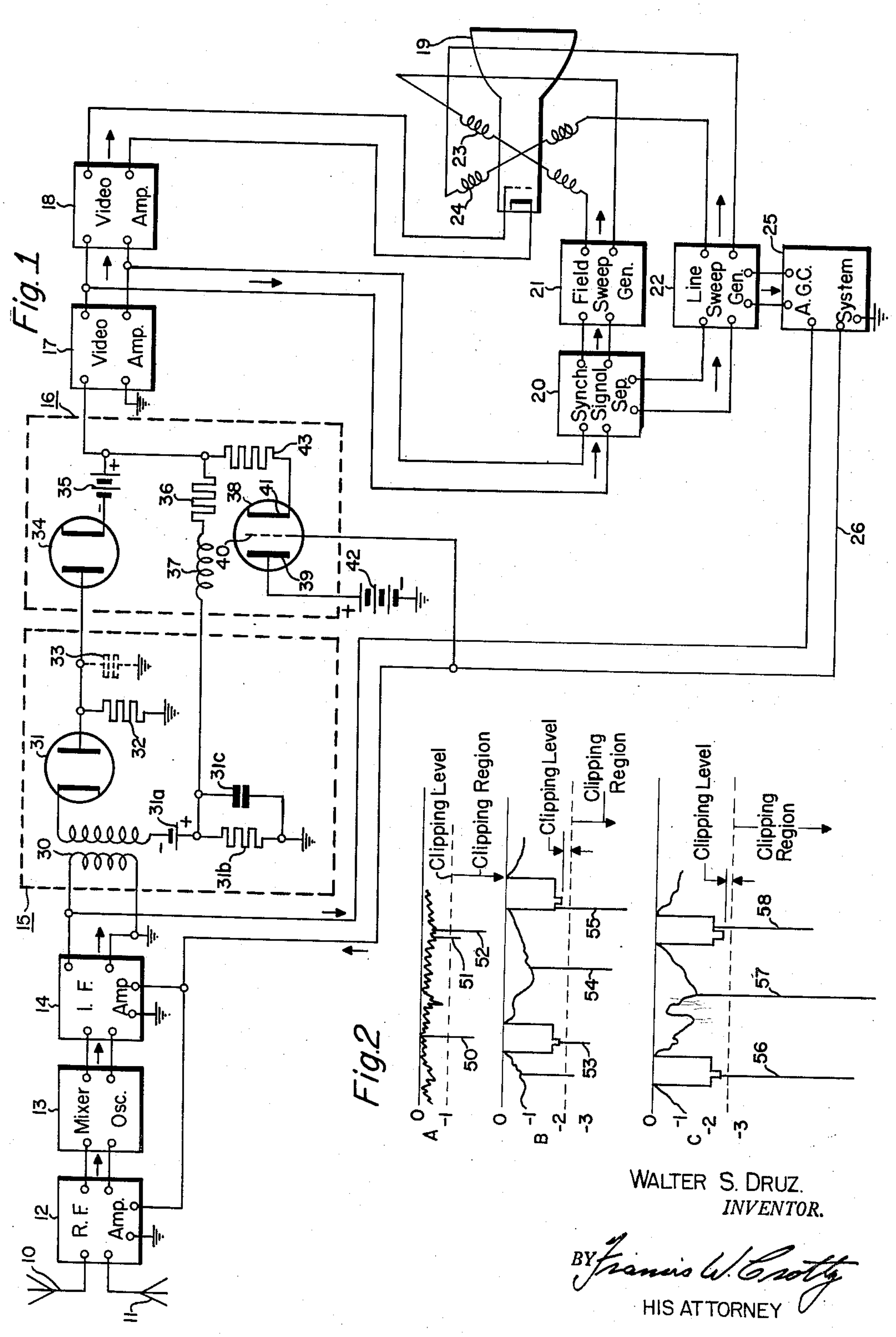
Fig. 1 is a circuit diagram, partly schematic, of a complete wave-signal receiver of the superheterodyne type embodying the present invention.
Fig. 2 represents certain operating characteristics of the circuit of Fig. 1.

Referring now more particularly to Fig. 1, the receiver there represented includes a radio-frequency amplifier 12 of one or more stages having its input terminals connected to an antenna system 10, 11. To the output terminals of amplifier 12 there are connected, in cascade, a first detector or mixer-oscillator 13, an intermediate-frequency amplifier 14 of any desired number of stages, a signal detector 15, an amplitude clipper 16 having an adjustable clipping level to be described more particularly hereinafter, a first video amplifier 17, and a second video amplifier 18 the output terminals of which are connected to the control electrode-cathode circuit of a conventional image-reproducing device 19 of the cathode-ray type. The output circuit of first video amplifier 17 is also connected to the input terminals of a synchronizing-signal separator 20 having two output circuits one of which is connected to a field-frequency sweep generator 21 while the other is connected to a line-sweep generator 22. The output circuits of the sweep generators 21 and 22 are coupled, respectively, to field-deflection elements 23 and line-deflection elements 24 of the tube 19 which are here shown as deflecting coils although it is to be understood that an electrostatic type of deflection may be employed if desired. The receiver is also provided with an automatic-gain-control system 25 which, although it may be of any known construction, is preferably of the type described and claimed in copending application Serial No. 39,368, filed on July 17, 1948, in the name of Albert Cotsworth III, now Patent No. 2,593,011, issued April 15, 1952 and assigned to the same assignee as the present invention. This type of automatic-gain-control system is gated by means of a sinusoidal signal occurring at the line frequency and obtained from line-sweep generator 22. Accordingly, this system has one input circuit connected with generator 22, as indicated, and another input circuit extending from intermediate-frequency amplifier 14 so that the gain control potential may be obtained by gated rectification of the intermediate-frequency signal of the receiver. The conductor 26 extending from the AGC system applies the gain-control potential to those stages of the receiver that have variable-gain characteristics, such as radio-frequency amplifier 12 and intermediate-frequency amplifier 14.

The arrangement as thus far described, except for the construction and operation of clipper 16, is a well known television receiver of the superheterodyne type and its operation need be described only briefly since it is thoroughly known to the art. A television signal intercepted by antenna 10, 11 is selectively amplified in radio-frequency amplifier 12 and delivered to mixer-oscillator 13 wherein it is heterodyned with a locally generated heterodyning signal to produce an intermediate-frequency signal corresponding to the operating frequency assigned to intermediate-frequency amplifier 14. This intermediate-frequency signal, after amplification in amplifier 14, is delivered to signal detector 15 wherein its modulation components are derived. Such modulation components are delivered to clipper 16 which is effective to translate essentially only the desired modulation components which are then supplied to and amplified by video-frequency amplifiers 17 and 18 after which they are applied to the input circuit of image-reproducing device 19. The signal applied to tube 19 intensity modulates the cathode-ray beam thereof in accordance with the shade values represented by the received signal.

At the same time, the output signal of video amplifier 17 is delivered to synchronizing-signal separator 20 wherein the synchronizing components are separated from the video information and the field and line-synchronizing components are delivered to the appropriate ones of sweep generators 21 and 22. These generators are thus synchronized with the synchronizing components of the received signal and supply suitably timed deflection signals to the field and line-deflecting elements 23 and 24 of image-reproducing device 19. In this manner, the cathode-ray beam of tube 19 is scanned across its target area in a series of fields of parallel lines concurrently with the intensity modulation effected by the video information of the received signal so that an image is synthesized on the screen of this device in the usual way.

During the operation of the receiver, the intermediate-frequency signal obtained from amplifier 14 is delivered to AGC system 25 which, under the control of the gating signal from sweep generator 22, derives a control potential in response to amplitude variations of the synchronizing components of the received signal. This control potential is of negative polarity and varies directly with changes in signal intensity and, as applied to the variable-gain stages of the receiver, maintains the signal input to the signal detector 15 within a relatively narrow amplitude range for a wide range of received signal intensities.

The described receiver, in accordance with present-day practice, is constructed to utilize a negatively-modulated television signal which includes video components and synchronizing signal components as already indicated. The expression "negatively-modulated signal" is intended to define a television signal wherein increasing values of carrier amplitude represent decreasing values of light intensity in the transmitted image. While the video components are confined to a given amplitude range of the carrier signal and their position in that range is determined entirely by the light and shade characteristics of the image being televised, the synchronizing components of the received signal represent a fixed shade value which may be black but which is usually blacker than black. Moreover, the received signal may be accompanied by undesired spurious noise signals having an amplitude exceeding that of the synchronizing components and the noise-suppression system of the instant invention minimizes the effect of such undesired components by suppressing them in clipper stage 16.

It will be recognized that units 12–18, inclusive, define the usual signal-translating channel of a television receiver which includes signal detector 15 referred to previously and shown specifically as of the diode peak-rectifier type. The coupling between this detector and intermediate-frequency amplifier 14 is in the form of a transformer 30 having a primary winding connected to the output terminals of amplifier 14 and having a secondary winding one terminal of which is connected to the cathode of a diode 31 and the other terminal of which is connected to the negative terminal of a bias battery 31*a*. The positive terminal of battery 31*a* is grounded through the parallel combination of a resistor 31*b* and a condenser 31*c*. The load circuit of the detector comprises a resistor 32 in parallel with a capacitance 33, shown in broken-line construction since it may be comprised in whole or in part of distributed or stray capacitance. The diode 31 is so poled that the modulation components derived across its load circuit 32, 33 have a negative polarity with respect to a fixed reference potential such as ground.

The amplitude clipper 16 is conductively coupled in series relation with signal detector 15 to translate signal components within an amplitude range from zero to an upper limit which is slightly greater than the amplitude level of the recurring synchronizing components for a received television signal of a given intensity which may here be considered as the threshold of useful signal intensity. More specifically, the amplitude clipper comprises a diode 34 and conductive means connecting the diode to the detector so that the signal polarity from the detector is in a sense tending to render the clipper non-conductive. This conductive means includes a conductive connection from the anode of diode 34 to the anode of the signal detecting device 31. The clipper circuit is completed through an adjustable bias means which applies a potential to the diode 34 tending to render it conductive to translate signals within an amplitude range determined by the effective value of the bias. The bias is provided by a battery 35, which has its negative terminal connected to the cathode of diode 34 and has its positive terminal connected to the anode through the signal detector, as well as an impedance formed of a resistor 36 in series relation with an inductor 37.

In accordance with the invention, regulating means are provided in the clipper, this means being responsive to an applied potential for increasing the upper limit of the amplitude range of the clipper in accordance with the magnitude of a control potential applied thereto. For the case under consideration, the regulating means comprises a relay device of the electron-discharge type shown as a triode 38 having an anode 39, a control electrode 40 and a cathode 41. The anode of the triode is directly connected to the positive terminal of a source of B potential 42 having a negative terminal directly connected to ground. The anode-cathode circuit of the triode consists of a cathode resistor 43 and the impedance network 36, 37 through which the cathode is connected to ground through the parallel combination of resistor 31*b* and condenser 31*c*, whereby the potential developed across the impedance 36—37 is caused to vary with the conductivity of tube 38. The control electrode 40 of tube 38 is connected to the AGC conductor 26 to provide means for applying the control potential developed in the AGC system to the regulating device, and the control electrode may be returned to ground through means (not shown) within the circuit of AGC stage 25.

In considering the operation of unit 16 and the manner in which it clips undesirable noise signals which exceed the amplitude of the recurring synchronizing components, it will be evident that the detected signal from detector 15 is of negative polarity and is in a sense tending to render the clipper diode 34 non-conductive, while the potential applied to the diode from battery 35 is in an opposite sense and tends to cause it to be conductive. At the same time, however, the cathode current of tube 38 gives rise to a voltage drop across impedance 36, 37 which opposes biasing source 35. The parameters of the circuit are so chosen that the net bias is in a direction to cause the clipper to conduct in the presence of any signals from detector 15 within an amplitude range from zero to an upper limit chosen to exceed only slightly the amplitude level of the synchronizing peaks of a received signal of threshold intensity. For example, resistor 32 may have a resistance value three times that of resistor 36, the potential of source 35 may be six volts, the potential of source 31*a* may be four and one-half volts and that developed across impedance 36, 37 in response to signals of threshold or lesser intensity may have a value of two volts. For the assumed conditions, the resulting bias of diode 34 is one volt since there is developed across resistor 32 three volts and is in a direction which biases the anode positively with respect to the cathode and thus tends to render the diode conductive. As a consequence, detected signal components from stage 15 that fall within an amplitude range from zero to an upper limt of one volt are passed directly by the clipper to video amplifiers 17, 18 and to image-reproducing device 19.

The described operating condition is illustrated by the curve of Fig. 2A wherein the upper limit of the range of signals translated by the clipper is represented by the dash-dot line at a signal level of minus one volt. A received television signal of the threshold intensity has, for the most part, detected modulation components within that amplitude range although its intensity is inadequate to cause a control potential to be developed by the AGC system 25. The modulation components of that signal are translated but the peaks of noise pulses, indicated by the pulses 50, 51 and 52, that exceed the clipping level of minus one volt are not translated.

The operating condition of Fig. 2B is predicated on the assumption that the received signal has an intensity which is greater than the threshold value and is sufficiently high that a weak control potential is developed by the gain-control system 25. The gain-control potential, which is of negative polarity as applied to the input circuit of regulating tube 38, causes this tube to become less conductive than for the first-described condition. As a result, the potential developed by impedance 36, 37 is reduced and bias source 35 is rendered more effective, establishing the clipping level in stage 16 at a greater amplitude as indicated by the dash-dot line at the signal voltage of slightly greater than minus two volts. In this manner the amplitude range of the clipping device is increased or follows the increase in intensity of the received signal so as to remain always slightly higher than the peaks of the recurring synchronizing components, and noise peaks such as 53, 54 and 55 are effectively eliminated.

The curve of Fig. 2C indicates the operating conditions in the presence of a signal of greater amplitude than that shown in Fig. 2B. Since the control potential from stage 25 increases with signal strength, the amplitude range of signal translation or clipping level is increased; in this example it is something less than three volts. The peaks of pulses such as 56, 57 and 58 that extend beyond the dash-dot line are clipped and the remainder of the signal is supplied to stage 17. It is to be noted that the clipping level, although altered in magnitude, remains at approximately the same relative magnitude slightly greater than the peak amplitude of the synchronizing-signal components as in the preceding example.

When the signal translated through stages 12—14 has a sufficiently high amplitude that the AGC system 25 takes over to maintain the signal intensity to detector 15 within a relatively narrow range for wide variations of received signal intensity, regulating device 38 of limiter 16 is approximately cutoff and the bias for rectifier 34 is only that provided by source 35. In other words, the clipper is operated at a fixed clipping level when the received signal is of sufficient intensity to cause the automatic-gain-control system to exercise its full effect. For this ultimate operating condition, it is apparent that the clipping level need not be varied inasmuch as the amplitude of the signal supplied to the clipper does not vary materially with variations in intensity of the received signal.

Noise suppression is achieved in stage 16 at a clipping level that follows the amplitude of the received television signals. Consequently, for received signals of low intensity, wherein the automatic-gain-control circuit is relatively inoperative, the clipper is effective to eliminate noise peaks and the signal-to-noise ratio does not decrease for weak signals as may be the case with certain prior-art systems.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a wave-signal receiver for utilizing a negatively-modulated television signal which includes video components and recurring components representing a fixed shade value of black or blacker than black and which may be accompanied by spurious signals having an amplitude exceeding that of said recurring components, a noise-suppression system comprising: a video-signal translating channel including a detector for deriving the modulation components of said television signal; an amplitude clipper included in said channel and conductively coupled in series relation with said detector for translating signal components within an amplitude range from zero to an upper limit which exceeds the amplitude level of said recurring components for a received television signal of a given threshold intensity; regulating means in said clipper responsive to an applied potential for increasing the upper limit of said amplitude range towards a preselected reference level and in accordance with the magnitude of the potential applied thereto; a gain control circuit responsive only to a received signal having an intensity greater than said threshold intensity for deriving a control potential having a magnitude determined by the intensity of said received signal; means for utilizing said control potential to tend to maintain the signal intensity to said detector within a narrow range for a wide range of received signal intensities; and means for applying said control potential to said regulating means to establish the upper limit of said amplitude range at said reference level during operating intervals in which the signal intensity to said detector is maintained within a narrow range.

2. In a wave-signal receiver for utilizing a negatively-modulated television signal which includes video components and recurring components representing a fixed shade value of black or blacker than black and which may be accompanied by spurious signals having an amplitude exceeding that of said recurring components, a noise suppression system comprising: a video-signal translating channel including a detector for deriving the modulation components of said television signal, said detector being so poled that said modulation components are derived with a given polarity with respect to a fixed reference potential; a diode type of amplitude clipper; conductive means connecting said clipper to said detector so that said polarity of signal potentials from said detector is in a sense tending to render said clipper non-conductive; an adjustable bias means for applying a potential to said clipper tending to render said clipper conductive to translate signal components within an amplitude range from zero to an upper limit, determined by said bias means and exceeding the amplitude level of said recurring components for a received television signal of a given threshold intensity; a gain control circuit responsive only to a received signal having an intensity greater than said threshold intensity for deriving a control potential having a magnitude determined by the intensity of said received signal; means for utilizing said control potential to tend to maintain the signal intensity to said detector within a narrow range for a wide range of received signal intensities; and means for utilizing said control potential to adjust said bias means and establish the upper limit of said amplitude range at a preselected reference level during operating intervals in which the signal intensity to said detector is maintained within a narrow range.

3. In a wave-signal receiver for utilizing a negatively-modulated television signal which includes video components and recurring components representing a fixed shade value of black or blacker than black and which may be accompanied by spurious signals having an amplitude exceeding that of said recurring components, a noise suppression system comprising: a video-signal translating channel including a detector for deriving the modulation components of said television signal; an amplitude clipper in said channel conductively connected in series with said detector for translating signal components within an amplitude range from zero to an upper limit; biasing means in circuit with said clipper including an impedance for presetting said upper limit to an amplitude level exceeding that of said recurring components for a received television signal of a given threshold intensity; an electron-discharge device having anode, cathode and control electrodes; an anode-cathode circuit for said device including said load impedance whereby the bias and amplitude range of said clipper vary with the conductivity of said device; a control electrode-cathode circuit for said device responsive to an applied potential for increasing the upper limit of said amplitude range toward a preselected reference level and in accordance with the magnitude of the potential applied thereto; a gain control circuit responsive only to a received signal having an intensity greater than said threshold intensity for deriving a control potential having a magnitude determined by the intensity of said received signal; means for utilizing said control potential to tend to maintain the signal intensity to said detector within a narrow range for a wide range of received signal intensities; and means for applying said control potential to said control electrode-cathode circuit to establish the upper limit of said amplitude range at said reference level during operating intervals in which the signal intensity to said detector is maintained within a narrow range.

4. In a wave-signal receiver for utilizing a negatively-modulated television signal which includes video components and recurring components representing a fixed shade value of black or blacker than black and which may be accompanied by spurious signals having an amplitude exceeding that of said recurring components, a noise suppression system comprising: a video-signal translating channel including a detector for deriving the modulation components of said television signal, said detector being so poled that said derived modulation components are negative with respect to a fixed reference potential; a diode type of amplitude clipper; conductive means connecting said clipper to said detector so that said negative-polarity modulation components tend to render said clipper non-conductive; biasing means in circuit with said clipper including a load impedance and a potential source poled to render said clipper conductive to effect translation of negative-polarity signal components within an amplitude range from zero to an upper limit exceeding said recurring components for a received television signal of a given threshold intensity; an electron-discharge device having anode, cathode and control electrodes; an anode-cathode circuit for said device including said load impedance for effectively increasing said biasing potential source and the upper limit of said amplitude range inversely with the conductivity of said device; a control electrode-cathode circuit for said device; a gain control circuit responsive only to a received signal having an intensity greater than said threshold intensity for deriving a control potential of negative polarity having a magnitude determined by the intensity of said received signal; means for utilizing said control potential to tend to maintain the signal intensity to said detector within a narrow range for a wide range of received signal intensities; and means for applying said control potential to said control electrode-cathode circuit to vary the conductivity of said device.

WALTER S. DRUZ.

References Cited in the file of this patent

UNITED STATES PATENTS

| Number | Name | Date |
|---|---|---|
| 2,265,883 | Applegarth | Dec. 9, 1941 |
| 2,296,393 | Martinelli | Sept. 22, 1942 |
| 2,300,115 | Grundmann | Oct. 27, 1942 |
| 2,337,005 | Selby | Dec. 14, 1943 |
| 2,518,449 | Coe | Aug. 15, 1950 |

FOREIGN PATENTS

| Number | Country | Date |
|---|---|---|
| 624,435 | Great Britain | June 8, 1949 |